UNITED STATES PATENT OFFICE.

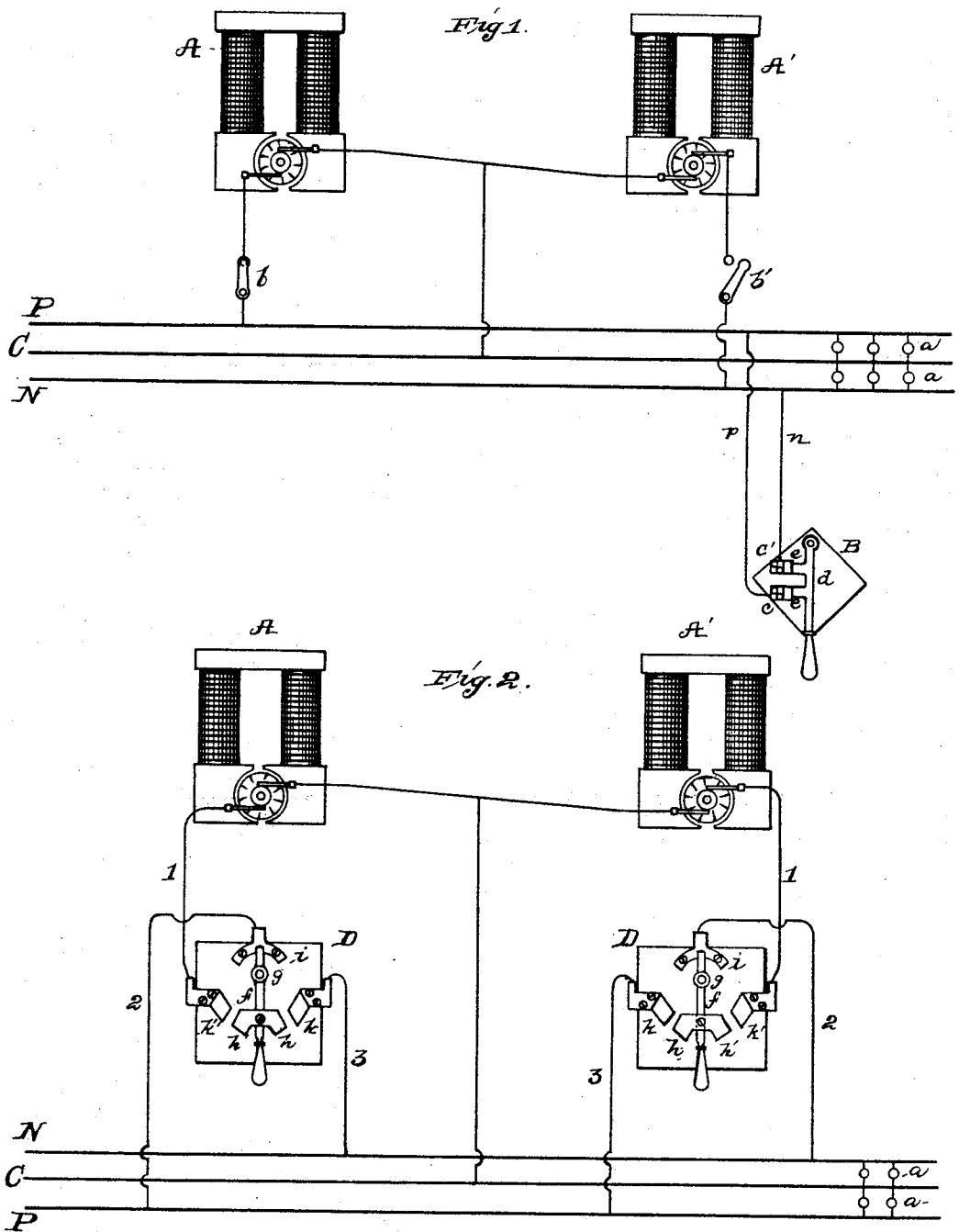

WILLIAM S. ANDREWS, OF NEW YORK, N. Y., ASSIGNOR TO THE EDISON ELECTRIC LIGHT COMPANY, OF SAME PLACE.

SYSTEM OF ELECTRICAL DISTRIBUTION.

SPECIFICATION forming part of Letters Patent No. 317,700, dated May 12, 1885.

Application filed October 31, 1884. (No model.)

*To all whom it may concern:*

Be it known that I, WILLIAM S. ANDREWS, of New York, in the county of New York and State of New York, have invented a certain new and useful Improvement in Systems of Electrical Distribution, of which the following is a specification.

My invention relates to the compensating or three-wire system of electric lighting, in which three conductors extend from the source of supply and the lamps are connected between the main conductors and the central or compensating conductor, the source of supply being also divided, and the compensating conductor being connected at the point of division of said source. In such a system, if the generator or generators comprising one of the divisions of the source should break down or become inoperative from any cause, or if the number of lamps in circuit becomes at any time so small that the generative capacity of one of the divisions is sufficient to supply them all with current, it is desirable to remove one of the divisions from the circuit and to throw the whole system upon the other.

The object of my invention is to conveniently accomplish this, and I do so by disconnecting the inoperative or unnecessary generator or generators from the system and connecting both the positive and the negative main conductors to the same terminal of the other generator or generators. Thus the two main conductors form one side of the circuit, while the central or compensating conductor is the other, and the lamps in circuit are connected between the said compensating conductor and one or the other of the two parts of the said opposite conductor. The current then flows out through the two main conductors, through the two sets of lamps, and back by the compensating conductor, or out by the compensating conductor and back by the two main conductors.

In carrying out my invention I may first disconnect the useless division from its main conductor and then connect the two main conductors together, which, it is evident, connects both said conductors to one pole of the other division, the other pole thereof being already connected with the compensating conductor. I may, however, employ a single switch, by which both steps of throwing one division out of circuit and of connecting together the two main conductors are performed.

My invention may be more readily comprehended by reference to the accompanying drawings, in which—

Figure 1 is a diagram illustrating the invention, and Fig. 2 a diagram showing the switch for performing the double action just described.

A and A' are generators of electricity, each of which forms a division of the source of energy. Each division may, however, comprise two or more generators, arranged in multiple arc or in series. One terminal of generator A is connected to positive main conductor P, and one pole of generator A' to negative main conductor N, while the other terminal of each generator is connected with the central or compensating conductor, C. The electric lamps or other translating devices $a\ a$ are connected between the main conductors and the compensating conductor. The system and the source of supply are thus divided into two parts.

Referring now to Fig. 1, should the generator A' become disabled so that the whole system must be supplied from A, the switch $b'$ is thrown off, as shown, and this generator is thus disconnected from main conductor N. From conductor P a wire, $p$, extends to contact $c$ of switch B, and from conductor N wire $n$ extends to contact $c'$ of said switch. This switch has a pivoted metal arm, $d$, carrying two contacts, $e\ e$, and when such contacts are brought against contacts $c\ c'$ circuit is made through $d$, connecting conductors P N together, the generator A being already connected to conductor P. This connects the same pole thereof to conductor N also. These two thus form one split conductor, being one side of a circuit of which conductor C is the opposite side, and the lamps are connected between the conductor C and the two parts of the split conductor. The current flows in one direction through conductors P and N, and in the other through C, passing through the lamps which connect the two sides of the circuit. The generator A also has a switch, $b$, for disconnecting it from the main conductor P, but the one switch, B, of course answers the same purpose for both machines. If there are too many lamps in circuit to be supplied by the one generator, it will be necessary to turn off a suitable number of these lamps.

My invention is also applied when the number of lamps in circuit becomes so small that one generator is capable of supplying them, as has been already mentioned.

In Fig. 2 is shown for each generator a switch, D, which combines the operations of the switches B and b b' of Fig. 1. The metal arm f of this switch is pivoted at g, and carries contacts h h', while its end rubs on a stationary contact arc, i. Stationary contacts k k' are also provided. Considering the switch on the right of the drawings, if its arm is thrown to the right, the generator A' is properly connected through wires 1 and 2 with main conductor N. Bringing the arm to a central position breaks the circuit of the generator, and throwing it to the left connects the conductors P and N together through 3 and 2. The switch for generator A may be manipulated in a similar manner.

What I claim is—

1. The combination, with positive and negative main conductors of a compensating system of electrical distribution, of a switch for connecting both said conductors to the same terminal of one of the divisions of the source of supply, substantially as set forth.

2. The combination, with positive and negative main conductors of a compensating system of electrical distribution, of a switch for connecting said conductors together, substantially as set forth.

3. The combination, with positive and negative main conductors of a compensating system of electrical distribution, of switches whereby either division may be disconnected from its main conductor and both said main conductors connected with the same terminal of the other division, substantially as set forth.

This specification signed and witnessed this 8th day of October, 1884.

WILLIAM S. ANDREWS.

Witnesses:
P. B. SHAW,
J. F. KIRBY.